US009534905B1

(12) United States Patent
Bostick et al.

(10) Patent No.: US 9,534,905 B1
(45) Date of Patent: Jan. 3, 2017

(54) INDOOR LOCATION VEHICLE DELIVERY

(71) Applicant: INTERNATIONAL BUSINESS MACHINES CORPORATION, Armonk, NY (US)

(72) Inventors: James E. Bostick, Cedar Park, TX (US); John M. Ganci, Jr., Cary, NC (US); Martin G. Keen, Cary, NC (US); Sarbajit K. Rakshit, Kolkata (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/005,148

(22) Filed: Jan. 25, 2016

(51) Int. Cl.
*G06F 19/00* (2011.01)
*G01C 21/20* (2006.01)
*G05B 15/02* (2006.01)
*G06Q 10/08* (2012.01)

(52) U.S. Cl.
CPC .............. *G01C 21/206* (2013.01); *G05B 15/02* (2013.01); *G06Q 10/083* (2013.01)

(58) Field of Classification Search
CPC ...... G01C 21/206; G05B 15/02; G06Q 10/083
USPC 700/245; 701/2, 25; 705/26.2, 338; 382/124
See application file for complete search history.

(56) References Cited

U.S. PATENT DOCUMENTS

| 7,450,062 B2 * | 11/2008 | McBurney | G01S 19/03 |
| | | | 342/357.4 |
| 2002/0089434 A1 * | 7/2002 | Ghazarian | G06Q 10/08 |
| | | | 340/988 |
| 2004/0176872 A1 * | 9/2004 | Eidemiller | B07C 3/12 |
| | | | 700/225 |
| 2014/0032034 A1 * | 1/2014 | Raptopoulos | G08G 5/0069 |
| | | | 701/25 |
| 2014/0136414 A1 * | 5/2014 | Abhyanker | G06Q 50/28 |
| | | | 705/44 |

(Continued)

FOREIGN PATENT DOCUMENTS

| WO | WO 2011038018 | * | 3/2011 | ............ G06Q 10/00 |
| WO | 2015095948 | | 7/2015 | |

OTHER PUBLICATIONS

Lavara, Nick; Gizmag.com; URL: http://www.gizmag.com/amazon-drones-gps-location-deliver/37431/; Retrieved from the Internt Sep. 8, 2015; 7 pages.

(Continued)

*Primary Examiner* — Jaime Figueroa
(74) *Attorney, Agent, or Firm* — Schmeiser, Olsen & Watts; John R. Pivnichny

(57) ABSTRACT

A method and system for delivering a package is provided. The method includes a receiving by a delivery vehicle delivery, rules and a temporary passcode for delivering a package to a secure indoor location of a customer premises. The delivery vehicle, including the package, is directed to the secured indoor location and upon arrival the temporary passcode is transmitted to a control system for the secure indoor location. In response, access to the secure indoor location is enabled and the delivery vehicle is directed into the secure indoor location for delivery of the package within the secure indoor location such that the package is placed within the secure indoor location. After delivery, the delivery vehicle is directed out of the secure indoor location. The passcode is again transmitted to the control system and in response access to the secure indoor location is disabled.

15 Claims, 4 Drawing Sheets

(56) References Cited

U.S. PATENT DOCUMENTS

| | | | | |
|---|---|---|---|---|
| 2014/0149244 | A1* | 5/2014 | Abhyanker | G06Q 10/087 705/26.2 |
| 2014/0254896 | A1* | 9/2014 | Zhou | B25J 9/0006 382/124 |
| 2015/0120094 | A1 | 4/2015 | Kimchi et al. | |
| 2015/0156031 | A1* | 6/2015 | Fadell | H04L 12/2816 700/276 |
| 2015/0248640 | A1* | 9/2015 | Srinivasan | G06Q 10/08355 705/338 |
| 2015/0301150 | A1* | 10/2015 | Stuckman | G01S 1/00 342/407 |
| 2015/0302495 | A1* | 10/2015 | Stuckman | G01S 1/00 705/26.35 |
| 2015/0336668 | A1* | 11/2015 | Pasko | B64C 39/024 701/2 |
| 2016/0033966 | A1* | 2/2016 | Farris | G05D 1/0088 701/15 |

OTHER PUBLICATIONS

Reader, Ruth; Amazon's drones could track you down to deliver your goods; VentureBeat.com; URL: http://ventruebeat.com/2015/05/08/amazons-drones-could-track-you-down-to-deliver-your-goods/; Retrieved from the Internet Sep. 8, 2015; 9 pages.

Kumparak, Greg; This Drone Can Save Lives and Fly Indoors Without Crashing Constantly; Techcrunch.com; URL: http://techcrunch.com/2015/02/09/this-drone-can-save-lives-and-flay-in-doors-withouth-crashing-constantly; Posted Feb. 9, 2015; Retrieved from the Internet Sep. 8, 2015; 9 pages.

Wingfield, Nick; Amazon Wins Approval to Test Delivery Drones Outdoors; The New York Times; Mar. 19, 2015; 2 pages.

Price, Rob; Here are Amazon's plans for delivery; Business Insider; May 8, 2015; 3 pages.

Archives for the Category: Delivery Drones; the Good Drone; URL: http://textually.org/drones/cat_delivery_drones.html; Retrieved from the Internet Sep. 23, 2015; 27 pages.

* cited by examiner

INDOOR LOCATION VEHICLE DELIVERY

FIELD

The present invention relates generally to a method for delivering a package to location and in particular to a method and associated system for delivering a package to a specified indoor location.

BACKGROUND

Determining an area for delivery of products typically includes an inaccurate process with little flexibility. Resolving accuracy issues with respect to the delivery area may include a complicated process that may be time consuming and require a large amount of resources. A delivery method may not take into account difficult delivery factors and therefore is unable to execute appropriate delivery actions. Accordingly, there exists a need in the art to overcome at least some of the deficiencies and limitations described herein above.

SUMMARY

A first aspect of the invention provides a vehicle delivery method comprising: receiving, by a computer processor of control hardware of a delivery vehicle, delivery rules for delivering a package to a secure indoor location of a customer premises; receiving, by the computer processor, a temporary passcode for accessing the secure indoor location; directing, by the computer processor, the delivery vehicle to the secured indoor location, wherein the package is loaded on the vehicle; first transmitting, by the computer processor, the temporary passcode to a control system for the secure indoor location; enabling by the computer processor in response to the first transmitting, access to the secure indoor location; directing, by the computer processor, the delivery vehicle into the secure indoor location; directing, by the computer processor, the delivery vehicle to deliver the package within the secure indoor location such that the package is placed within the secure indoor location; directing, by the computer processor, the delivery vehicle out of the secure indoor location; second transmitting, by the computer processor, the temporary passcode to the control system for the secure indoor location; and disabling by the computer processor in response to the second transmitting, access to the secure indoor location.

A second aspect of the invention provides a computer program product, comprising a computer readable hardware storage device storing a computer readable program code, the computer readable program code comprising an algorithm that when executed by a computer processor of control hardware of a delivery vehicle implements a vehicle delivery method, the method comprising: receiving, by the computer processor, delivery rules for delivering a package to a secure indoor location of a customer premises; receiving, by the computer processor, a temporary passcode for accessing the secure indoor location; directing, by the computer processor, the delivery vehicle to the secured indoor location, wherein the package is loaded on the vehicle; first transmitting, by the computer processor, the temporary passcode to a control system for the secure indoor location; enabling by the computer processor in response to the first transmitting, access to the secure indoor location; directing, by the computer processor, the delivery vehicle into the secure indoor location; directing, by the computer processor, the delivery vehicle to deliver the package within the secure indoor location such that the package is placed within the secure indoor location; directing, by the computer processor, the delivery vehicle out of the secure indoor location; second transmitting, by the computer processor, the temporary passcode to the control system for the secure indoor location; and disabling by the computer processor in response to the second transmitting, access to the secure indoor location.

A third aspect of the invention provides a control hardware device comprising a computer processor coupled to a computer-readable memory unit, the memory unit comprising instructions that when executed by the computer processor executes a vehicle delivery method comprising: receiving, by the computer processor, delivery rules for delivering a package to a secure indoor location of a customer premises, wherein the control hardware device is comprised by the delivery vehicle; receiving, by the computer processor, a temporary passcode for accessing the secure indoor location; directing, by the computer processor, the delivery vehicle to the secured indoor location, wherein the package is loaded on the vehicle; first transmitting, by the computer processor, the temporary passcode to a control system for the secure indoor location; enabling by the computer processor in response to the first transmitting, access to the secure indoor location; directing, by the computer processor, the delivery vehicle into the secure indoor location; directing, by the computer processor, the delivery vehicle to deliver the package within the secure indoor location such that the package is placed within the secure indoor location; directing, by the computer processor, the delivery vehicle out of the secure indoor location; second transmitting, by the computer processor, the temporary passcode to the control system for the secure indoor location; and disabling by the computer processor in response to the second transmitting, access to the secure indoor location.

The present invention advantageously provides a simple method and associated system capable of determining an area for delivery of packages.

DETAILED DESCRIPTION

Figure 1:
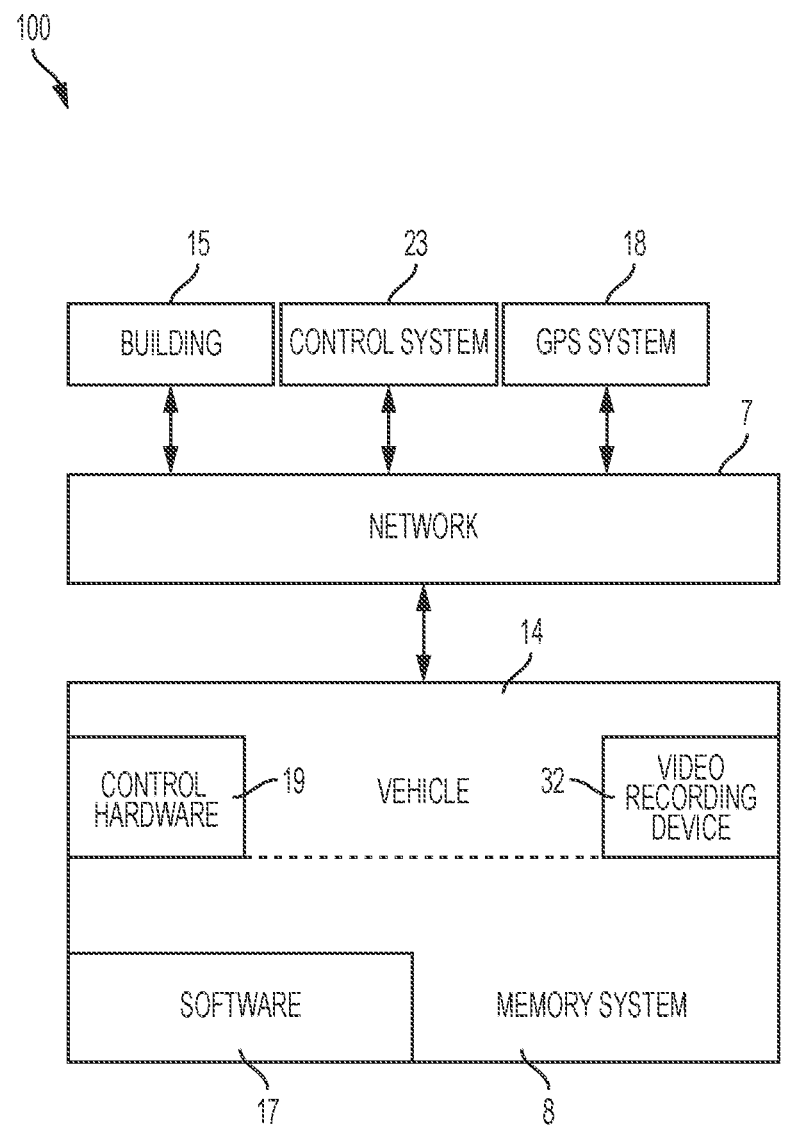
FIG. 1 illustrates a system 100 for directing a package delivery to an indoor location, in accordance with embodiments of the present invention

FIG. 1 illustrates a system 100 for directing a package delivery to an indoor location, in accordance with embodiments of the present invention. System 100 enables a process for determining a specific indoor location for a vehicle 14 delivery of consignments or packages to an indoor location for any type of structures by leveraging defined delivery rules. Vehicle 14 may comprise any vehicle that does not require a human operator to be located within the vehicle 14 such as, inter alia, a remote controlled vehicle (e.g., an aircraft flown by a pilot at a ground control station), an autonomously controlled vehicle (e.g., an aircraft controlled based on pre-programmed flight plans and may include an intelligence algorithm that would enable vehicle 14 to know it's location and self-determine a route deliver a package to a location dynamically), a pre-programmed vehicle, etc. Alternatively, vehicle 14 may comprise any type of vehicle that includes a human operator located within the vehicle (e.g., an aircraft, an automobile, a boat or ship, a train, etc.). Vehicle 14 may include, inter alia, an aerial vehicle, a land based vehicle, a marine (water) based vehicle, etc.

System 100 enables vehicle 14 to receive a delivery address, business rules and safeguards, and necessary temporary passcodes so that vehicle 14 is able to enter a locked building (e.g., a garage, a house, an apartment, an office building, a warehouse, etc.) and deliver a package to a specified indoor location within the building (e.g., via usage of cameras, image processing, and building layout maps). After the package is delivered, vehicle 14 is enabled to exit and secure (e.g., lock) the building. Additionally, the delivery event may be logged (via a video recording device) to ensure that building 15 has not been damaged. Vehicle 14 may be provided with badge access to a specific door in building 15 such that vehicle 14 may hover near an electronic badge reader and use proximity badging to gain access to building 14.

System 100 of FIG. 1 includes a building 15, a vehicle control system 23, and a GPS system 18 connected through a network to a vehicle 14. Vehicle 14 (i.e., control hardware 19 internal to vehicle), vehicle control system 23, and GPS system 18 each may comprise an embedded computer. An embedded computer is defined herein as a remotely portable dedicated computer comprising a combination of computer hardware and software (fixed in capability or programmable) specifically designed for executing a specialized function. Programmable embedded computers may comprise specialized programming interfaces. Additionally, vehicle 14 (i.e., control hardware 19 internal to vehicle), vehicle control system 23, and GPS system 18 may each comprise a specialized hardware device comprising specialized (non-generic) hardware and circuitry (i.e., specialized discrete non-generic analog, digital, and logic based circuitry) for executing a process described with respect to FIGS. 1-3. The specialized discrete non-generic analog, digital, and logic based circuitry may include proprietary specially designed components (e.g., a specialized integrated circuit designed for only implementing an automated process for enabling a directing vehicle 14 to deliver a package within building 15). Vehicle 14 includes a memory system 8, software 17, a video recording device 32, and control hardware 19 (all sensors and associated control hardware for enabling software 17 to execute a process for directing vehicle 14 to deliver a package within building 15). Sensors may include, inter alia, GPS sensors, temperature sensors, pressure sensors, infrared sensors, motion sensors, etc.). The memory system 8 may include a single memory system. Alternatively, the memory system may include a plurality of memory systems. Network 7 may include any type of network including, inter alia, a local area network (LAN), a wide area network (WAN), the Internet, a wireless network, etc. Vehicle 14 may retrieve/generate GPS coordinates based data (from GPS system 18) in response to package delivery instructions.

System 100 of FIG. 1 enables vehicle 14 to automatically and electronically unlock barriers (e.g., windows, doors, etc.) in building 15. Temporary codes for locking, unlocking, opening, and closing electronically controlled barriers may be provided to vehicle 14 during a secure configuration process. Rules for delivery execution may be specified in an electronic contract set up by a user and executed by vehicle 14. An on board video recording device 32 (e.g., a camera) may be enabled to log a series of events during a delivery process and an associated image processing process may be enabled. For example, vehicle 14 may be instructed to deliver a package on a table in a specific room. Additionally, an internal map of building 15 may be provided during the secure configuration process. The internal map is analyzed by vehicle 14 in order to navigate within building 15 to deliver the package to a specific location within building 15.

Figure 2:
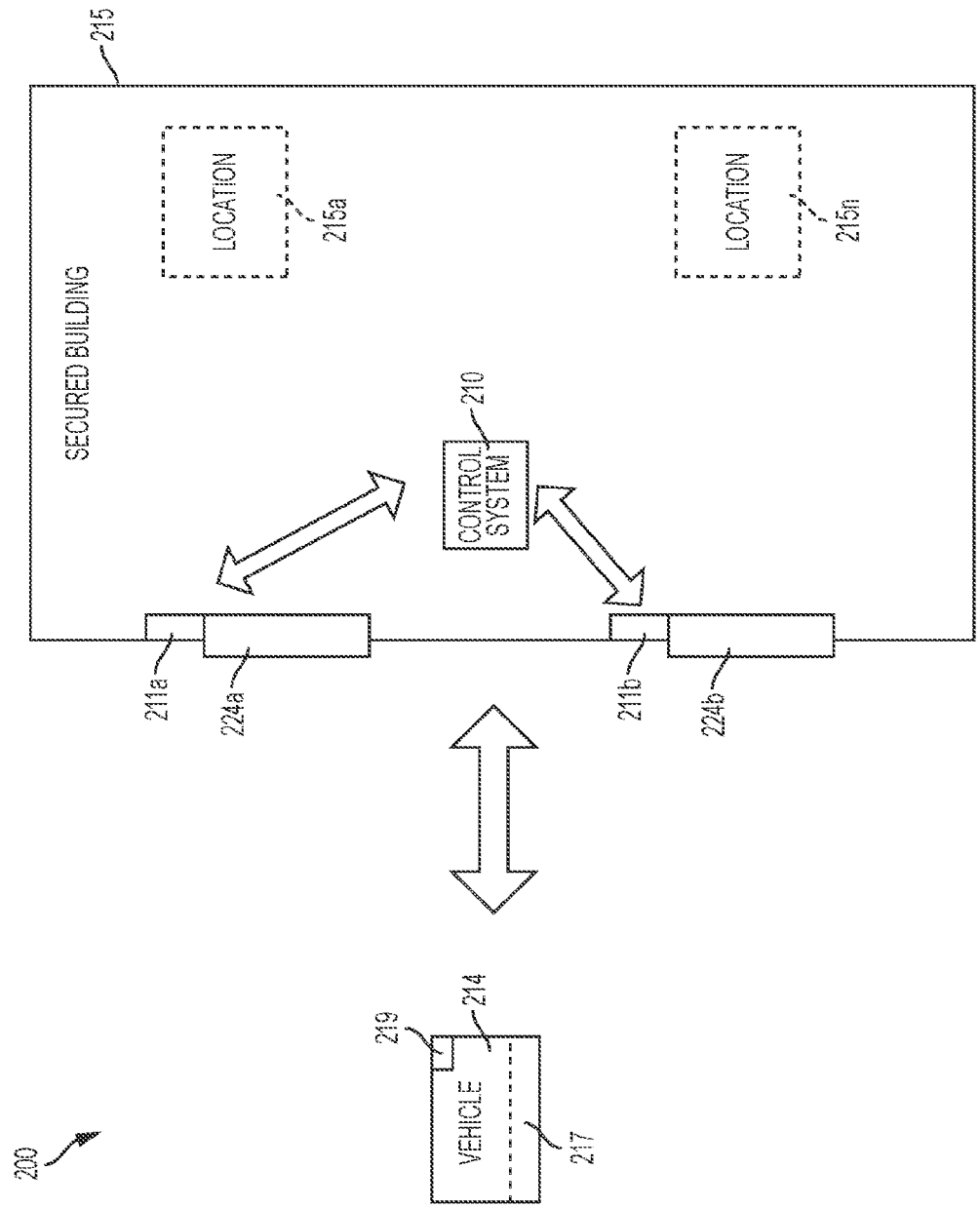
FIG. 2 illustrates an internal view of a secure building comprising a control system in communication with a vehicle for directing a package delivery process, in accordance with embodiments of the present invention.

FIG. 2 illustrates an internal view of a secure building 215 comprising a control system 210 in communication with a vehicle 214 for directing a package delivery process, in accordance with embodiments of the present invention. Secure building 215 and vehicle 214 represent detailed views of building 15 and vehicle 14 (of FIG. 1), respectively. Vehicle 214 comprises a video retrieval device 219 and is carrying a package 217 for delivery. Secure building 215 comprises a control system (or hardware) in communication with electromechanical devices 211a and 211b securing barriers 224a and 224b, respectively. Barriers 224a and 224b may comprise any type of barriers for allowing access to secure building 215 including, inter alia, a door, a window, a garage door, etc. Electromechanical devices 211a and 211b comprise electronically controlled locks (i.e., for locking barriers 224a and 224b) and electronically controlled mechanisms (e.g., a motor, a solenoid based spring loaded mechanism, etc.) for automatically opening and closing barriers 224a and 224b. Control system 210 is configured to receive a command from vehicle 214 and automatically transmit the command to electromechanical devices 211a and 211b to unlock and open or close and lock barriers 224a and 224b. For example, electromechanical devices 211a and 211b may comprise electronically controlled locks on a door such that communications may be transmitted to vehicle 214 via a secure Website such that vehicle 214 is configured to unlock entrances to a house. Additionally, a garage door passcode could be transmitted to vehicle 214 via a secure website so that vehicle 214 would have the capability to open and close a garage door. Likewise, vehicle 214 may be enabled to command electronically controlled sliding windows to slide open such that vehicle 214 is able to use the window as a passage-way into secure building 215. The secure Website enables users to specify temporary passcodes capable of enabling vehicle 214 to open a door or window in a house. The temporary passcode may be specified as valid for specified time period of delivery. Control hardware (e.g., control hardware 19 in FIG. 1) in vehicle 214 is configured to receive and retain specified temporary passcodes for specified doors or windows at any specified location. A process for receiving and retaining the specified temporary passcodes may be associated with business rules such that vehicle 214 could automatically determine specified doors or windows for access for delivery during operation of vehicle 214.

Video retrieval device 219 (e.g., an onboard camera) may be configured to record events associated with the delivery of package 217. For example, record events may include, inter alia, a state of a home upon arrival and departure of vehicle 214, a delivery location within the home, etc. An image processing process may be enabled to locate a specified location (e.g., location 215a or 215b) such as, inter alia, a couch, a table, etc. Additionally, vehicle 214 in combination with video retrieval device 219 may retrieve an internal map of secure building 215 and execute an image processing process so that vehicle 214 may efficiently navigate secure building 215 to determine a drop location for package 217.

The following implementation example illustrates a process for directing a package delivery process with respect to vehicle 214 and secure building 215:

The process is initiated via a secure Website enabling a user to specify and execute delivery rules and various capabilities, backup plans, and secure passcodes. For example, the delivery rules and various capabilities, backup plans, and secure passcodes may include: passcodes for a given door or window, a location of a given door or window, a map illustrating a door or window to be opened, a map illustrating the inside of a building, specified rules for a delivery, pictures of a delivery spot to further clarify a package drop off spot, etc. Examples of the specified rules for a delivery may include:

1. Please drop off package in the game room on the brown table. If the vehicle is unable to drop off package in the game room on the brown table (e.g., an obstruction, pet issues, etc,) then please drop off package in the foyer. If an entrance door or window does not open, then return the package back to the factory or leave the package on the porch.
2. Please lock the door upon exiting the building.

Upon completion of the initiation process, target areas for delivery of the package are electronically transmitted to the delivery vehicle (e.g., vehicle 214) such that the delivery vehicle enables machine intelligence to decipher specified rules (e.g. drop the package in the game room). The delivery vehicle determines an exact spot in a delivery building (e.g., secure building 215) to drop the package. In response, the vehicle initiates motion moves towards the delivery building to deliver the package. The delivery vehicle accesses a GPS location of the delivery building and is directed to the delivery building. Upon arrival at the delivery building, a logging process is initiated to record the delivery event for logging purposes. Additionally, the delivery vehicle locates a window, door, or garage door for entrance to the secure building and uses the temporary passcode to enable access to the delivery building. In response, the vehicle enters the building and a package drop is enabled immediately upon entry into an unobstructed area. Alternatively, the vehicle may be instructed to locate a specified location within the building and make the package drop. Upon completion of the package drop, the vehicle exits the building and closes and locks the door or window. Additionally, the vehicle may receive confirmation that the door or window has been locked and the process is terminated.

Figure 3:
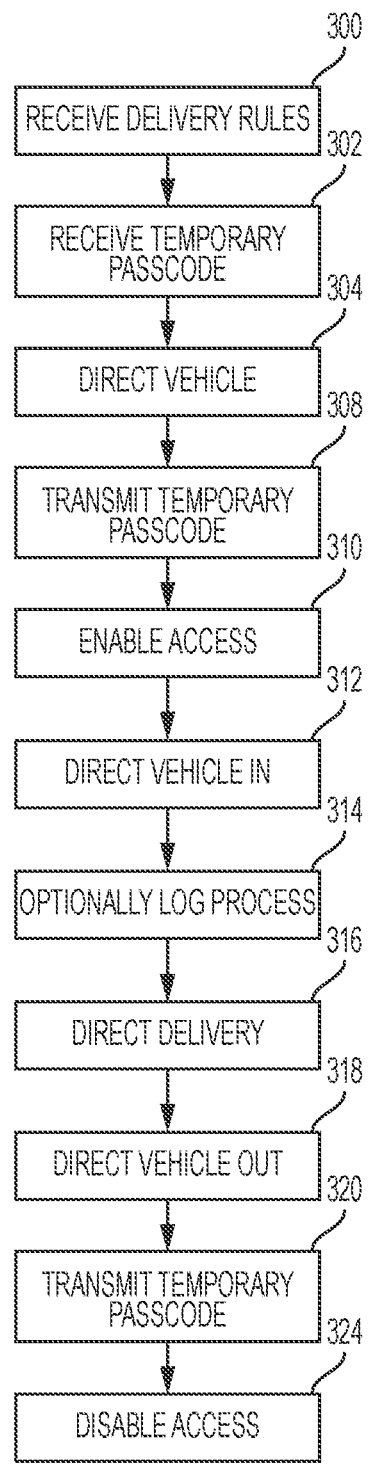
FIG. 3 illustrates an algorithm detailing a process flow enabled by the system of FIG. 1 for directing a package delivery to an indoor location, in accordance with embodiments of the present invention.

FIG. 3 illustrates an algorithm detailing a process flow enabled by system 100 of FIG. 1 for directing a package delivery to an indoor location, in accordance with embodiments of the present invention. Each of the steps in the algorithm of FIG. 3 may be enabled and executed in any order by a computer processor(s) executing computer code. In step 300, delivery rules for delivering a package to a secure indoor location of a customer premises are received by control hardware of a delivery vehicle. The delivery rules may include, inter alia, an address of the customer premises, GPS coordinates of the secure indoor location, a backup delivery plan for an alternate delivery location with respect to the secure indoor location, etc. In step 302, the control hardware receives a temporary passcode for accessing the secure indoor location. In step 304, the package is loaded onto the delivery vehicle and the delivery vehicle is directed to the secured indoor location. Upon arrival at secure indoor location, the vehicle transmits the temporary passcode to a control system for the secure indoor location in step 308.

The temporary passcode transmission may be executed via a RFID tag based process or a magnetic strip based process. An RFID tag based process may include the temporary passcode being transmitted to the control system via communications between an RFID tag (on the delivery vehicle), an RFID tag reader (at the secure indoor location), and the control system. A magnetic strip based process may include the temporary passcode being transmitted to the control system via communications between an encoded magnetic strip (on the delivery vehicle) a magnetic strip reader (at the secure indoor location) and the control system. In step 310, access to the secure indoor location is enabled in response to the temporary passcode. In order to enable access to the secure indoor location, the secure indoor location may include a first electromechanical device securing a barrier for an entry point of the secure indoor location and a second electromechanical device configured to automatically open or close the barrier. The enabling process may include activating the first electromechanical device such that the barrier becomes unsecured and automatically opening the barrier by the second electromechanical device. The first electromechanical device may include a solenoid activated locking mechanism. The second electromechanical device may include a motor. The entry point may include a door or a window. In step 312, the delivery vehicle is directed into the secure indoor location. In step 314, an optional logging process is executed. The logging process may include:

1. Recording (by a video recording device of the delivery vehicle) placement of the package (after delivery) within the secure indoor location.
2. Recording the secure indoor location and determining based on image processing of the recording, a specific drop point for the package within the secure indoor location.
3. Receiving (by the delivery vehicle) an internal map describing all interior portions of the secure indoor location, recording the secure indoor location, and determining (based on analysis of the internal map and the recording) a specific drop point for the package within the secure indoor location.
4. Recording the secure indoor location and logging all processes associated with delivery vehicle delivering the package to the secure indoor location.

In step 316, the delivery vehicle is directed to deliver the package within the secure indoor location such that the package is placed within the secure indoor location. In step 318 (after completion of the delivery), the delivery vehicle is directed out of the secure indoor location. In step 320, temporary passcode is again to the control system for the secure indoor location. In step 324, access to the secure indoor location is disabled in response to step 320. Access to the secure indoor location may be disabled by additionally activating the second electromechanical device such that the barrier is closed and activating the first electromechanical device such that the barrier becomes secured.

Figure 4:
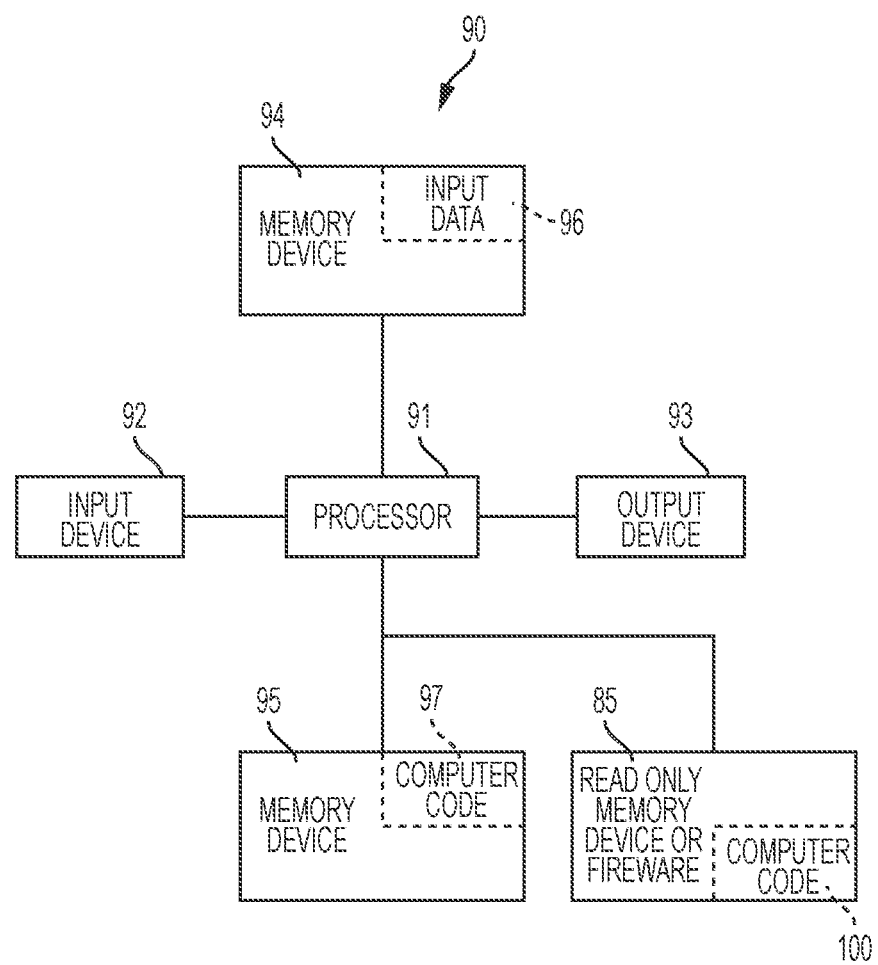
FIG. 4 illustrates a computer system used by the system of FIG. 1 for enabling a process for directing a package delivery to an indoor location, in accordance with embodiments of the present invention.

FIG. 4 illustrates a computer system 90 (e.g., control system 23, control hardware 19 and/or control system 210) used by or comprised by the systems of FIG. 1 and FIG. 2 for enabling a process for directing a package delivery to an indoor location, in accordance with embodiments of the present invention.

Aspects of the present invention may take the form of an entirely hardware embodiment, an entirely software embodiment (including firmware, resident software, microcode, etc.) or an embodiment combining software and hardware aspects that may all generally be referred to herein as a "circuit," "module," or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing apparatus receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, device (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing device to produce a machine, such that the instructions, which execute via the processor of the computer or other programmable data processing device, create means for implementing the functions/acts specified in the flowchart and/or block diagram block or blocks. These computer readable program instructions may also be stored in a computer readable storage medium that can direct a computer, a programmable data processing device, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing device, or other device to cause a series of operational steps to be performed on the computer, other programmable device or other device to produce a computer implemented process, such that the instructions which execute on the computer, other programmable device, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The computer system 90 illustrated in FIG. includes a processor 91, an input device 92 coupled to the processor 91, an output device 93 coupled to the processor 91, and memory devices 94 and 95 each coupled to the processor 91. The input device 92 may be, inter alia, a keyboard, a mouse, a camera, a touchscreen, etc. The output device 93 may be, inter alia, a printer, a plotter, a computer screen, a magnetic tape, a removable hard disk, a floppy disk, etc. The memory devices 94 and 95 may be, inter alia, a hard disk, a floppy disk, a magnetic tape, an optical storage such as a compact disc (CD) or a digital video disc (DVD), a dynamic random access memory (DRAM), a read-only memory (ROM), etc. The memory device 95 includes a computer code 97. The computer code 97 includes algorithms (e.g., the algorithms of FIG. 3) for enabling a process control system 23. The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices Such as read only memory device 96) may include the algorithms of FIG. 3 and may be used as a computer usable medium (or a computer readable medium or a program storage device) having a computer readable program code embodied therein and/or having other data stored therein, wherein the computer readable program code includes the computer code 97. Generally, a computer program product (or, alternatively, an article of manufacture) of the computer system 90 may include the computer usable medium (or the program storage device).

In some embodiments, rather than being stored and accessed from a hard drive, optical disc or other writeable, rewriteable, or removable hardware memory device 95, stored computer program code 84 (e.g., including the algorithm of FIG. 3) may be stored on a static, nonremovable, read-only storage medium such as a Read-Only Memory (ROM) device 85, or may be accessed by processor 91 directly from such a static, nonremovable, read-only medium 85. Similarly, in some embodiments, stored computer program code 97 may be stored as computer-readable firmware 85, or may be accessed by processor 91 directly from such firmware 85, rather than from a more dynamic or removable hardware data-storage device 95, such as a hard drive or optical disc.

Still yet, any of the components of the present invention could be created, integrated, hosted, maintained, deployed, managed, serviced, etc. by a service supplier who offers to direct a package delivery to an indoor location. Thus, the present invention discloses a process for deploying, creating, integrating, hosting, maintaining, and/or integrating computing infrastructure, including integrating computer-readable code into the computer system 90, wherein the code in combination with the computer system 90 is capable of performing a method for enabling a process for directing a package delivery to an indoor location. In another embodiment, the invention provides a business method that performs the process steps of the invention on a subscription, advertising, and/or fee basis. That is, a service supplier, such as a Solution Integrator, could offer to enable a process for directing a package delivery to an indoor location. In this case, the service supplier can create, maintain, support, etc. a computer infrastructure that performs the process steps of the invention for one or more customers. In return, the service supplier can receive payment from the customer(s) under a subscription and/or fee agreement and/or the service supplier can receive payment from the sale of advertising content to one or more third parties.

While FIG. 4 shows the computer system 90 as a particular configuration of hardware and software, any configuration of hardware and software, as would be known to a person of ordinary skill in the art, may be utilized for the purposes stated supra in conjunction with the particular computer system 90 of FIG. 4. For example, the memory devices 94 and 95 may be portions of a single memory device rather than separate memory devices.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A vehicle delivery method comprising:
receiving, by a computer processor of control hardware of a delivery vehicle, delivery rules for delivering a package to a secure indoor location of a customer premises, wherein said delivery rules comprise rules selected from the group consisting of an address of said customer premises, GPS coordinates of said secure indoor location, and a backup delivery plan for an alternate delivery location with respect to said secure indoor location;
receiving, by said computer processor, a temporary passcode for accessing said secure indoor location;
directing, by said computer processor, said delivery vehicle to said secured indoor location, wherein said package is loaded on said vehicle;
first transmitting, by said computer processor, said temporary passcode to a control system for said secure indoor location;
enabling by said computer processor in response to said first transmitting, access to said secure indoor location, wherein said secure indoor location comprises a first electromechanical device comprising an electronically controlled lock securing a barrier for an entry point of said secure indoor location, wherein said secure indoor location comprises a second electromechanical device configured to automatically open or close said barrier, and wherein said enabling said access to said secure indoor location further comprises;
    activating via said temporary passcode, said first electromechanical device such that said electronically controlled lock becomes unlocked and said barrier becomes unsecured; and
    automatically opening, via said second electromechanical device, said barrier after performing said activating;
directing, by said computer processor, said delivery vehicle into said secure indoor location;
directing, by said computer processor, said delivery vehicle to deliver said package within said secure indoor location such that said package is placed on a specified placement apparatus within a specified room within said secure indoor location;
determining, by said computer processor based on a video logging process, that said secure indoor location has not been damaged by said delivery vehicle;
directing, by said computer processor, said delivery vehicle out of said secure indoor location;
second transmitting, by said computer processor, said temporary passcode to said control system for said secure indoor location; and
disabling by said computer processor in response to said second transmitting, access to said secure indoor location.

2. The method of claim 1, wherein said disabling said access to said secure indoor location further comprises:
additionally activating said second electromechanical device such that said barrier is automatically closed; and
additionally activating said first electromechanical device such that said barrier becomes secured.

3. The method of claim 1, wherein said entry point comprises a door or a window.

4. The method of claim 1, wherein said first electromechanical device comprises a solenoid activated locking mechanism.

5. The method of claim 1, wherein said second electromechanical device comprises a motor.

6. The method of claim 1, wherein said temporary passcode is transmitted to control system via a wireless transmission process.

7. The method of claim 1, wherein said delivery vehicle comprises an RFID tag, wherein said secure indoor location comprises an RFID tag reader, and wherein said temporary passcode is transmitted to control system via communications between said RFID tag, said RFID tag reader, and said control system.

8. The method of claim 1, wherein said delivery vehicle comprises an encoded magnetic strip tag, wherein said secure indoor location comprises a magnetic strip reader, and wherein said temporary passcode is transmitted to said control system via communications between said encoded magnetic strip, said magnetic strip reader, and said control system.

9. The method of claim 1, wherein said delivery vehicle comprises a video recording device, and wherein said method further comprises:
  recording, by said video recording device, placement of said package within said secure indoor location.

10. The method of claim 1, wherein said delivery vehicle comprises a video recording device, and wherein said method further comprises:
  recording, by said video recording device, said secure indoor location; and
  determining, by said computer processor based on image processing of said recording, a specific drop point for said package within said secure indoor location.

11. The method of claim 1, wherein said delivery vehicle comprises a video recording device, and wherein said method further comprises:
  receiving, by said computer processor, an internal map describing all interior portions of said secure indoor location;
  recording, by said video recording device, said secure indoor location; and
  determining, by said computer processor based on analysis of said internal map and said recording, a specific drop point for said package within said secure indoor location.

12. The method of claim 1, wherein said delivery vehicle comprises a video recording device, and wherein said method further comprises:
  recording, by said video recording device, said secure indoor location; and
  logging, by said computer processor, all processes associated with said delivery vehicle delivering said package to said secure indoor location.

13. The method of claim 1, further comprising:
  providing at least one support service for at least one of creating, integrating, hosting, maintaining, and deploying computer-readable code in the control hardware, said code being executed by the computer processor to implement: said receiving said delivery rules, said receiving said temporary passcode, said directing said delivery vehicle to said secured indoor location, said first transmitting, said enabling, said directing said delivery vehicle into said secured indoor location, said directing said delivery vehicle to deliver said package, said directing said delivery vehicle out of said secured indoor location, said second transmitting, and said disabling.

14. A computer program product, comprising a non-transitory computer readable hardware storage device storing a computer readable program code, said computer readable program code comprising an algorithm that when executed by a computer processor of control hardware of a delivery vehicle implements a vehicle delivery method, said method comprising:
  receiving, by said computer processor, delivery rules, wherein said delivery rules comprise rules selected from the group consisting of an address of said customer premises, GPS coordinates of said secure indoor location, and a backup delivery plan for an alternate delivery location with respect to said secure indoor location;
  receiving, by said computer processor, a temporary passcode for accessing said secure indoor location;
  directing, by said computer processor, said delivery vehicle to said secured indoor location, wherein said package is loaded on said vehicle;
  first transmitting, by said computer processor, said temporary passcode to a control system for said secure indoor location;
  enabling by said computer processor in response to said first transmitting, access to said secure indoor location, wherein said secure indoor location comprises a first electromechanical device comprising an electronically controlled lock securing a barrier for an entry point of said secure indoor location, wherein said secure indoor location comprises a second electromechanical device configured to automatically open or close said barrier, and wherein said enabling said access to said secure indoor location further comprises;
    activating via said temporary passcode, said first electromechanical device such that said electronically controlled lock becomes unlocked and said barrier becomes unsecured; and
    automatically opening, via said second electromechanical device, said barrier after performing said activating;
  directing, by said computer processor, said delivery vehicle into said secure indoor location;
  directing, by said computer processor, said delivery vehicle to deliver said package within said secure indoor location such that said package is placed on a specified placement apparatus within a specified room within said secure indoor location;
  determining, by said computer processor based on a video logging process, that said secure indoor location has not been damaged by said delivery vehicle;
  directing, by said computer processor, said delivery vehicle out of said secure indoor location;
  second transmitting, by said computer processor, said temporary passcode to said control system for said secure indoor location; and
  disabling by said computer processor in response to said second transmitting, access to said secure indoor location.

15. A control hardware device comprising a computer processor coupled to a non-transitory computer-readable memory unit, said memory unit comprising instructions that when executed by the computer processor executes a vehicle delivery method comprising:
  receiving, by said computer processor, delivery rules, wherein said delivery rules comprise rules selected from the group consisting of an address of said customer premises, GPS coordinates of said secure indoor location, and a backup delivery plan for an alternate delivery location with respect to said secure indoor location;

receiving, by said computer processor, a temporary passcode for accessing said secure indoor location;

directing, by said computer processor, said delivery vehicle to said secured indoor location, wherein said package is loaded on said vehicle;

first transmitting, by said computer processor, said temporary passcode to a control system for said secure indoor location;

enabling by said computer processor in response to said first transmitting, access to said secure indoor location, wherein said secure indoor location comprises a first electromechanical device comprising an electronically controlled lock securing a barrier for an entry point of said secure indoor location, wherein said secure indoor location comprises a second electromechanical device configured to automatically open or close said barrier, and wherein said enabling said access to said secure indoor location further comprises;

activating via said temporary passcode, said first electromechanical device such that said electronically controlled lock becomes unlocked and said barrier becomes unsecured; and automatically opening, via said second electromechanical device, said barrier after performing said activating;

directing, by said computer processor, said delivery vehicle into said secure indoor location;

directing, by said computer processor, said delivery vehicle to deliver said package within said secure indoor location such that said package is placed on a specified placement apparatus within a specified room within said secure indoor location;

determining, by said computer processor based on a video logging process, that said secure indoor location has not been damaged by said delivery vehicle;

directing, by said computer processor, said delivery vehicle out of said secure indoor location;

second transmitting, by said computer processor, said temporary passcode to said control system for said secure indoor location; and disabling by said computer processor in response to said second transmitting, access to said secure indoor location.

\* \* \* \* \*